United States Patent [19]

Mears, Jr.

[11] 3,846,725

[45] Nov. 5, 1974

[54] COIL RETAINER

[75] Inventor: Donald B. Mears, Jr., Enfield, Conn.

[73] Assignee: General Instrument Corporation, Newark, Ill.

[22] Filed: Apr. 30, 1973

[21] Appl. No.: 355,976

[52] U.S. Cl. ............... 336/92, 174/92, 174/138 F, 336/192, 336/208
[51] Int. Cl. ............................................. H01f 27/30
[58] Field of Search ....... 336/192, 90, 92, 198, 209, 336/208; 174/92, 138 F; 339/208

[56] References Cited
UNITED STATES PATENTS

| 3,092,797 | 6/1963 | Wood ........................... | 174/138 F X |
| 3,147,338 | 9/1964 | Ekvall et al. ................... | 174/92 X |
| 3,183,302 | 5/1965 | Wochner et al. ................ | 174/92 X |
| 3,223,776 | 12/1965 | Piasecki ....................... | 174/138 F X |
| 3,278,674 | 10/1966 | Matthysse et al. ............. | 174/92 X |
| 3,325,591 | 6/1967 | Wahl ............................ | 174/92 X |
| 3,332,053 | 7/1967 | Busler .......................... | 174/138 F |
| 3,711,633 | 1/1973 | Ghirardi et al. ................ | 174/92 X |

Primary Examiner—Thomas J. Kozma

[57] ABSTRACT

A coil retaining device for use in mounting an FM coil or the like on a circuit board is disclosed. The coil is of the type which is wound on a coil form and has at least one lead extending therefrom to connect it to the circuit board. The device comprises a pair of coil form retaining members which assemble in opposing relationship to form an enclosure for the coil. Each of the members has a portion situated on the end thereof having an aperture therein which is aligned and shaped to receive and securely retain the coil form. Means are provided for articulately connecting one of the opposing ends of each of the members such that the members may be moved between assembled and separated positions. The connecting means has a lead aperture therein through which the lead extends such that the coil may be electrically connected to the circuit board.

32 Claims, 5 Drawing Figures

PATENTED NOV 5 1974

COIL RETAINER

The present invention pertains to apparatus for connecting components to a circuit board and more particularly to a device for physically mounting and electrically connecting an FM coil to a circuit board.

Coils of conductive wire, having variable inductance, are utilized in FM receivers having pushbutton tuning in order to tune the receiver to a particular frequency in response to the depression of a pushbutton. The inductance of the coil is varied by the movement of a magnetically conductive core within the coil itself. Normally the coil is wound on a hollow coil form through which the core is moved. The core is mechanically connected to one of the pushbuttons such that the depression of the pushbutton moves the core within the coil form thus changing the inductance of the coil. In the operation of such a system, it is critical that the coil be properly aligned with the pushbutton mechanism so that the core can move within the form. Should misalignment occur, excessive slug core drag may be present which causes poor repeat pushbutton performance, excessive backlash, high pushbutton operating force and poor thermal drift characteristics.

In the past, coils of both the AM and FM types have been mounted within the coil housing of the tuner by means of a mounting clip or coil board. Normally only one end of the coil is physically connected to the clip or coil board. For FM type coils, this mounting method presents certain problems because the free end of the coil may easily become misaligned during further assembly if the assembler exerts too much force on the non-connected end of the coil. Misalignment in this situation may seriously disrupt the proper functioning of the tuner, as described above.

The position of the core in each of the FM coils in a particular tuner must be adjusted with respect to the connection with the pushbutton assembly to provide for the proper tuning thereby. In order to do this, physical access to each core is necessary. Therefore, an opening in the coil housing is provided aligned with the coil support to provide this access. A tool is inserted through the opening and into the form to adjust the position of the core with respect to the pushbutton assembly. Unless the access hole and the core are properly aligned, the proper adjustment of the core is prevented. Therefore, the coil must be mounted to the coil housing precisely at the correct position with respect to the access opening. This is often extremely difficult to accomplish when a coil board or clip is utilized.

Conventional methods of physically mounting coils in tuners generally employ a single coil board for mounting the AM as well as the FM coils. However, AM coils tend to be more unreliable than FM coils. If, during testing, the tuner is found to have a defective AM coil, it has proven less expensive to dismount the entire coil board and replace it with a new coil board having new coils thereon, rather than to replace the single defective coil on the coil board. If however, the FM coils are mounted separately, it is simpler and more economical to replace the AM coil board assembly only. In this way the cost of repair, salvage or scrap is significantly reduced. In addition, it is desirable from an electrical point of view to have the FM coils mounted separately because the length of the lead wires of the coil in an FM coil is critical. With separate mountings, the leads can be kept as small as possible.

The present invention is a coil retainer suitable for use in a variety of different applications with a number of different types of coils. However, it is particularly useful for mounting FM-type coils into the coil housing of an automotive radio tuner and is therefore disclosed with this intended application in mind. It should be recognized, however, that numerous other applications for the present invention are possible as will appear to those skilled in the art as the present invention is described in detail herein.

It is, therefore, a prime object of the present invention to provide a coil retainer for physically mounting an FM coil directly to the coil housing of a tuner without the necessity for the use of a coil board or mounting clip.

It is a second object of the present invention to provide a coil retainer which will provide the necessary alignment between the coil core and an access hole located on the coil housing.

It is another object of the present invention to provide a coil retainer in which both ends of the coil form are maintained in alignment with the remainder of the tuner in order to prevent excessive slug core drag.

It is a further object of the present invention to provide a coil retainer which can be used to retain different sized coils interchangeably.

It is still another object of the present invention to provide a coil retainer in which a defective coil can easily and inexpensively be replaced.

It is an additional object of the present invention to provide a coil retainer which can be utilized to insulate the coil leads for either a top mounted component board or a rear mounted component board.

In accordance with the present invention a coil retaining device for use in mounting an FM coil or the like in a coil housing on a circuit board is provided. The coil which is retained in the device is of the type which is wound on a coil form and has at least one lead extending therefrom to electrically connect the coil with the circuit board. The device comprises a pair of coil form retaining members which assemble in opposing relationship to form an enclosure for the coil. Each of these members has a portion situated on each end thereof to engage the coil form. Each of these end portions has an aperture there into which the coil form is placed. Each of these apertures is aligned and shaped to receive and securely retain a different end of the coil form such that the entire length of the form is held in alignment.

Means are provided for articulately connecting one of the opposing edges of each of the coil form retaining members such that the members may be moved between assembled and separated positions. The connecting means is provided with a lead aperture through which the coil lead extends such that the coil may be electrically connected to the circuit board.

Means for mounting the device directly to the coil housing of a circuit board is provided operably connected to the coil form retaining members and extending edgewise therefrom beyond the members such that the device may be physically mounted to the housing and aligned with an access hole therein. This device eliminates the necessity for a coil board or mounting clip secured to the coil housing and therefrom substantially reduces the changes for misalignment of the coil which may occur during further assembly of the tuner.

To the accomplishment of the above and to such other objects as may hereinafter appear, the present invention relates to a coil retaining device for use in mounting an FM coil or the like in a coil housing as defined in the appended claims and as described in the specification, taken together with the accompanying drawings in which like numerals refer to like parts and wherein:

The present invention comprises a pair of coil form retaining members, generally designated A, each of which preferably has a generally half cylindrical shape with the interior of each of the half cylinders being hollowed out. On each end of each of the members A is situated a portion, generally designated B, which has an aperture, generally designated C, within which a coil form, generally designated D, will be disposed and securely retained. Means, generally designated E, are provided for articulately connecting one of the opposing edges of each of the members A such that the members A may be moved between assembled and expanded positions. In the expanded position, the coil form D may be inserted into one of the members A with each of its sides resting on one of the end portions B. The device is then closed to form a hollow cylinder which will then securely retain the coil form D in position.

A lead aperture, generally designated F, is present in the connecting means E such that a coil lead may extend therethrough and therefore be electrically connected to the circuit board. Preferably, means generally designated G are provided operably connected to the coil form members A and extending therefrom beyond the extremities of members A such that the device may be physically connected to the coil housing by means G. The device, therefore, provides a means for physically retaining the coil with respect to the coil housing as well as for preventing misalignment of the coil while permitting easy and inexpensive replacement of the coil.

Figure 1:
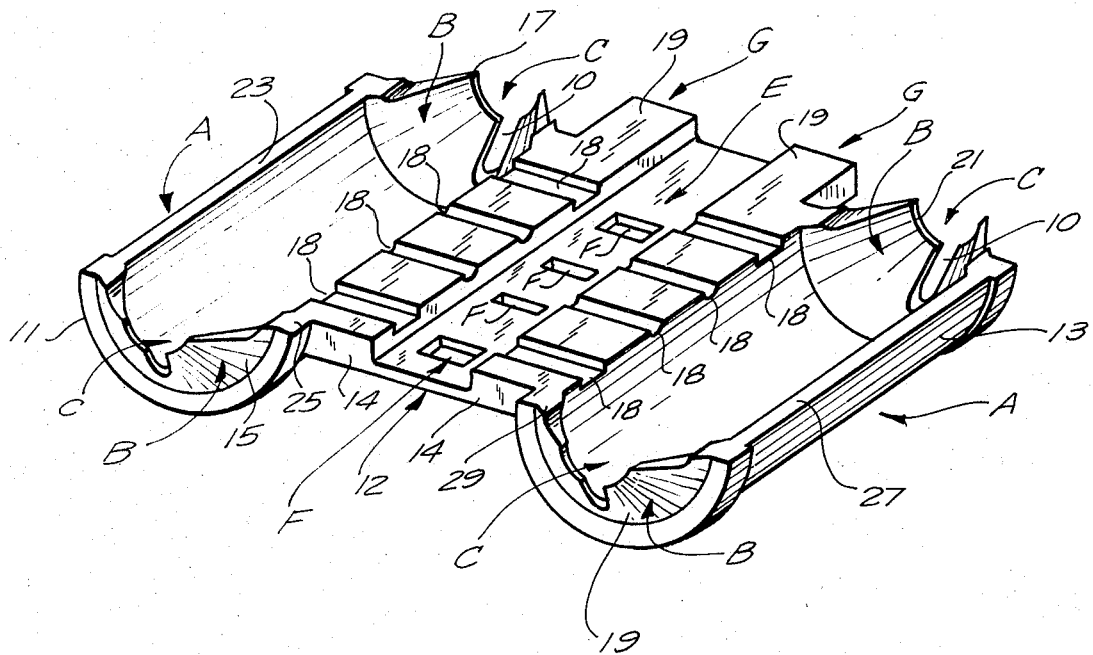
FIG. 1 is an isometric view of the device of the present invention in the expanded position.

More specifically, FIG. 1 shows the coil retaining device of the present invention in the expanded position prior to the insertion of a coil therein. The coil retaining portion of the device consists of a pair of coil form retaining members A, which, after the insertion of a coil therein will be moved to the assembled position to form an enclosure for the coil. Each of the members A, formed of molded plastic, has a substantially half cylindrical shaped wall 11 and 13, respectively. Walls 11, 13 are preferably rigid such that when assembled, a hollow cylindrical shell is formed to enclose the coil.

Each of the members A is provided with an end portion B at each end. Specifically, end portions 15 and 17 are defined by wall 11 of one member A. Likewise, portions 19 and 21 are defined by wall 13 of the other member A. Preferably, each portion B is integral with its adjacent wall and made of a thin, resilient material. The end portions B may be formed such that when members A are assembled each opposing pair of portions 15, 19 and 17, 21 join to form a conical member which extends beyond the edge of members A.

Each portion B has a substantially semicircular aperture C therein which, when the device is assembled, will form a circular opening which will receive and securely retain a coil form D. The resiliency of members B will permit forms D of different diameter to be securely retained within aperture C. The protruding conical shape of portions B extends the point of engagement of portions B with the form D to the extreme ends of the form D to provide for more stable mounting thereof.

End portions B are provided on both ends of members A such that both ends of form D are supported by the device to insure that the entire length of the coil will be properly aligned with the pushbutton mechanism thus preventing excessive slug core drag. To alleviate the problem of buckling of portions B when a relatively large form D is inserted into the device, a number of slots 10 are provided in members B radially extending from aperture C. The resiliency of the end portions B and the action of the slots C permit the device to be used in conjunction with a variety of different sized coil forms. Thus, it is possible to use a single size retaining device for a variety of different type and size coils.

In the assembled position, each of the ends of form D extend slightly beyond the confines of the device to provide accessibility to the interior thereof. The front end (left in the drawings) is situated such that a member 31, which forms part of the pushbutton assembly, can be operably connected to the core of the coil. Member 31 will be moved in accordance with the depression of the pushbutton such that the core of the coil is moved to vary the inductance of the coil. Access to the rear (right in the drawings) of the coil form D is also necessary to permit the proper positioning of the core with respect to member 31. Generally, member 31 is connected to the core such that the rotation of the core with respect to member 31 will vary the position of the core in relation to member 31. A tool is inserted into the rear of the coil to engage and rotate the core to adjust its position. In order to do this, access to the core from the rear of the coil must be provided.

Walls 11 and 13 of members A each have a pair of edges 23, 25 and 27, 29 respectively. When assembled to form the coil enclosure, the edges 23 and 27 will oppose each other. Edges 25 and 29 are articulately connected by connecting means E which acts as a hinge such that members A may be moved from the expanded position (FIG. 1) to the assembled position (FIG. 2) after the coil has been inserted therein. Means E, which provides a movable joint between the members A as well as a means for retaining the coil leads, comprises a flexible hinge portion 12 which permits the movement of members A between the expanded and assembled positions. Integrally connected between each side of hinge 12 and edges 25 and 29, respectively, are a pair of lead retaining elements 14. Elements 14 space hinge 12 from the edges of members A such that a protrusion is formed along the length of the device when it is assembled. The leads of the coil will extend from the protrusion so that they can be connected to the tuner.

Figure 2:
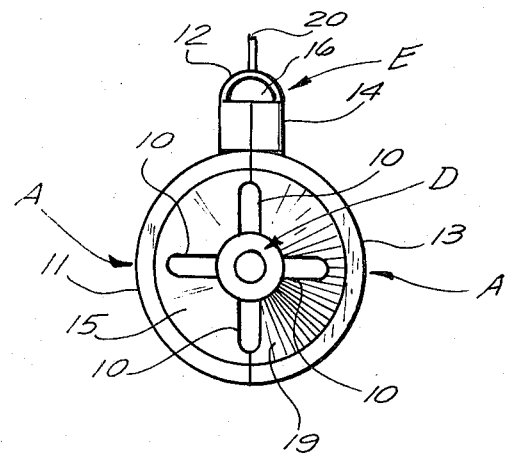
FIG. 2 is an end elevational view of the preferred embodiment of the present invention in the assembled position.
Figure 3:
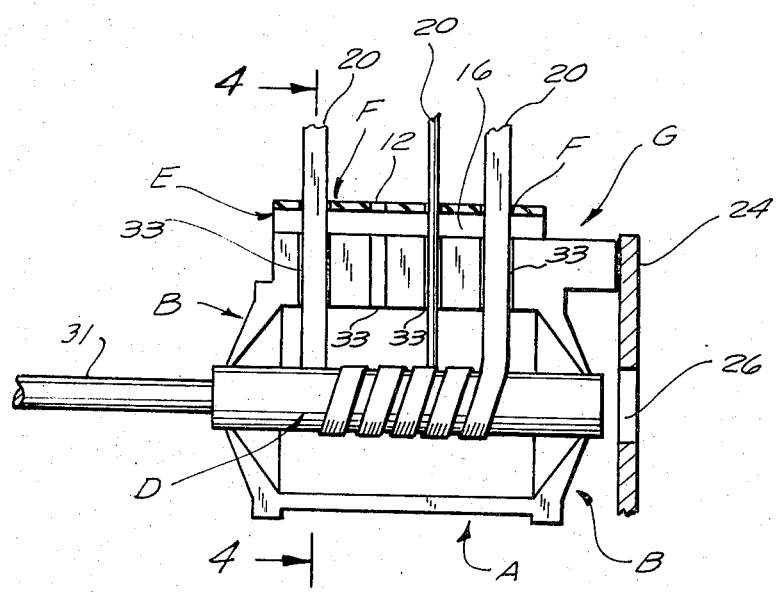
FIG. 3 is a cross-sectional side view of the preferred embodiment of the present invention with the coil mounted therein.
Figure 4:
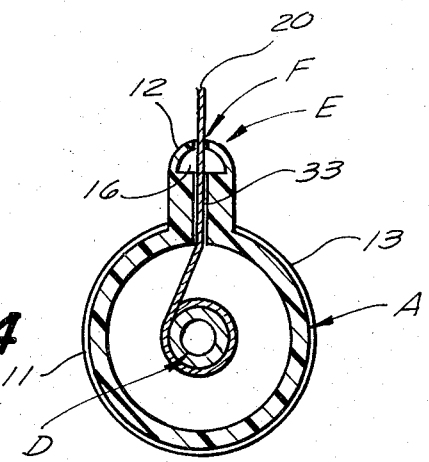
FIG. 4 is a cross-sectional view taken along line 4—4 of FIG. 3.

As can be seen in FIGS. 2 and 3, hinge 12, after assembly, is spaced from elements 14 such that an open-ended channel 16 is formed along means E. When the device is used with a rear mounted circuit board (FIG. 5) as explained in detail below, the channel will permit a lead 20 to extend along the inside of channel 16 to insulate the lead from the leads which extend along the outside of hinge 12.

As can be seen in FIG. 1, each of the lead retaining elements 14 has a plurality of grooves 18 therein running between the edge of member A and hinge portion 12. When the device is assembled each of the grooves 18 on one of the elements 14 aligns with the corresponding groove 18 on the other element 14 to form a channel 33 through which a coil lead 20 may extend. Channels 33 serve to retain the coil leads 20 in place as well as to insulate the coil leads 20 from one another. A plurality of apertures F are formed through the surface of hinge portion 12 such that when the device is assembled one of the apertures F is aligned with each of the channels 33. Apertures F permit the leads 20 situated in the channels 33 to xtend from the device in order to permit connection of the leads 20 to the circuit board of the component in which the coil is mounted.

Referring now to FIG. 3, mounting means G comprises a pair of members 19 each of which is situated in alignment with one of the coil retaining members 14 and extends outwardly therefrom beyond the extremities of coil retaining members A. Members 19 are adopted, when assembled, to be secured to the wall of coil housing 24 by means of any conventional mounting method, such as a slot or aperture (not shown) in housing 24 into which the assembled member 19 snugly fits. The position at which member 19 is mounted on coil housing 24 is determined such that the rear of coil form D (right in the drawings) is in alignment with aligning aperture 26 formed in the coil housing 24.

It is necessary to have an aperture 26 to provide access to the coil core such that the coil may be tuned. Opening 26 in the coil housing 24 permits the insertion of a tool through the coil housing 24 into form D. The position of the core of the coil is adjusted with respect to member 31 such that the movement of member 31 places the core in the correct position in the form to produce the proper inductance for tuning. It is, therefore, extremely important that the coil form be correctly aligned with opening 26. This is accomplished by the correct positioning of mounting means G with respect to coil housing 24 which will thereafter permit the insertion of the tool through opening 26 and into the coil form D.

Figure 5:
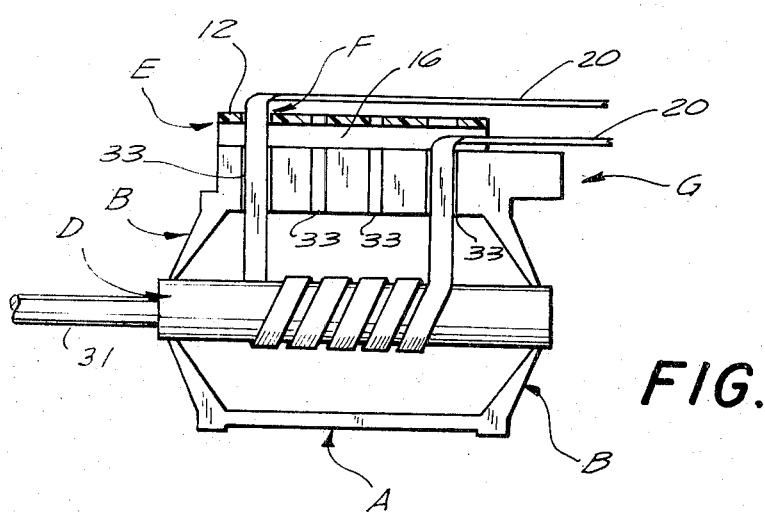
FIG. 5 is a view similar to that of FIG. 3 but wherein the device is used in conjunction with a rear mounted circuit board.

The device of the present invention is designed such that it can be used with a top-mounted component board or a rear-mounted component board as may be desired. FIG. 3 shows the use of the device with a top-mounted component board. In this figure the coil leads 20 extend through the channels 33 and exit the device through apertures F formed on hinge portion 12. Since each of the channels 33 are spaced apart, the leads 20 are insulated from each other within the device. FIG. 5 shows the device when used in conjunction with a rear-mounted component board. In this configuration the leads 20 again extend through the passage 33. However, one of the leads 20 extends through aperture F in hinge 12 while the other lead does not pass through the aperture F corresponding to its channel 33 but is bent to extend along open-ended channel 16 and therefore out the side of the device. In this situation hinge portion 12 performs the additional function of insulating the leads 20 from each other along the length of the device.

A preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

I claim:

1. In combination, a FM coil or the like and a coil retaining device for the mounting of said coil on a circuit board, the coil being of coil housing on a circuit board, the coil being of the type having at least one lead extending therefrom to connect it to the circuit board, said device comprising a coil form upon which the coil is wound, a pair of coil form retaining members which assemble in opposing relationship to form an enclosure for the coil, each of said members having a portion situated on each end thereof, each of said end portions having an aperture therein, said apertures engaging and securely retaining said coil form, means for articulately connecting one of the opposing edges of each of said members such that said members may be moved between assembled and separated positions, said connecting means having a lead aperture forming a passage therethrough when said members are assembled such that said coil lead may be electrically connected to said circuit board.

2. The device according to claim 1 wherein said connecting means comprises a hinge, said hinge having a flexible portion for articulately connecting one of the opposing edges of each of said members.

3. The device according to claim 2 wherein said hinge is integral with the members.

4. The device according to claim 1 wherein each of said members has a half cylindrical shape such that a substantially cylindrical shaped enclosure is formed when the members are assembled.

5. The device according to claim 1 wherein said end portions are made of resilient material such that different size and shaped coil forms may be engaged and retained in position.

6. The device according to claim 1 wherein each of said end portions has a slot extending from said aperture whereby said end portions may deform and thus retain coil forms of different sizes and shapes.

7. The device according to claim 2 wherein said hinge has a pair of lead retaining elements each of which is connected between said flexible portion and the opposing edge of a different one of said members.

8. A coil retaining device for use in mounting an FM coil or the like in a coil housing on a circuit board, the coil being of the type which is wound on a coil form and having at least one lead extending from the coil to connect it to the circuit board, said device comprising a pair of coil form retaining members which assemble in opposing relationship to form an enclosure for the coil, each of said members having a portion situated on each end thereof, each of said end portions having an aperture therein, said apertures being aligned and shaped to engage and securely retain the coil form, means for articulately connecting one of said opposing edges of each of said members such that said members may be moved between assembled and separated positions, said connecting means having a lead aperture for forming a passage therethrough when said members are assembled such that said coil lead may be electrically connected to said circuit board, said connecting means comprising a hinge, said hinge having a flexible portion for articulately connecting one of the opposing edges of each of said members and comprising a pair of lead retaining elements each of which is connected between said flexible portion and the opposing edge of a different one of said members, each of said elements having a groove therein, said elements and said grooves being aligned when said members are assembled to form a channel in said elements through which the coil may extend.

9. The device according to claim 8 wherein said flexible portion of said hinge has an aperture therein aligned with said channel such that the lead can extend through said aperture from said device to the circuit board.

10. The device according to claim 4 wherein each of said end portions is substantially semicircular.

11. The device according to claim 1 wherein the apertures in said end portions are substantially semicircular.

12. The device according to claim 1 further comprising means for mounting the device to the circuit board.

13. A coil retaining device for use in mounting an FM coil or the like in a coil housing in a circuit board, the coil being of the type which is wound on a coil form and having at least one lead extending from the coil to connect it to the circuit board, said device comprising a pair of coil form retaining members which assemble in opposing relationship to form an enclosure for the coil, each of said members having a portion situated on each end thereof, each of said end portions having an aperture therein, said apertures being aligned and shaped to engage and securely retain the coil form, means for articulately connecting one of the opposing edges of each of said members such that said members may be moved between assembled and separated positions, said connecting means having a lead aperture forming a passage therethrough when said members are assembled such that said coil lead may be electrically connected to said circuit board, and means for mounting the device to the circuit board, said mounting means comprising a mounting member operably connected to said coil form retaining members, said mounting member extending edgewise beyond said coil form retaining members such that the device may be physically connected to the coil housing by said mounting member.

14. A coil retaining device for use in mounting an FM coil or the like in a coil housing on a circuit board, the coil being of the type which is wound on the coil form and having at least one lead extending from the coil to connect it to the circuit board, said device comprising a pair of coil form retaining members which assemble in opposing relationship to form an enclosure for the coil, each of said members having a portion situated on each end thereof, each of said end portions having an aperture therein, said apertures being aligned and shaped to engage and securely retain the coil form, means for articulately connecting one of the opposing edges of each of said members such that said members may be moved between assembled and separated positions, said connecting means having a lead aperture forming a passage therethrough when said members are assembled such that the coil lead may be electrically connected to said circuit board, said connecting means comprising a hinge, said hinge having a flexible portion for articulated connecting one of said opposing edges of each of said members, and comprising a pair of lead retaining elements each of which is connected between said flexible portion and the opposing edge of a different one of said members, and a mounting member extending from one of said lead retaining elements such that the device may be physically connected to the circuit board by said mounting member.

15. A coil retaining device for use in mounting an FM coil or the like in a coil housing on a circuit board, the coil being of the type which is wound on a coil form and having at least one lead extending from the coil to connect it to the circuit board, said device comprising a pair of coil form retaining members which assemble in opposing relationship to form an enclosure for the coil, each of said members having a portion situated on each end thereof, each of said end portions having an aperture therein, said apertures being aligned and shaped to engage and securely retain the coil form, means for articulately connecting one of the opposing edges of each of said members such that said members may be moved between assembled and separated positions, said connecting means having a lead aperture forming a passage therethrough when said members are assembled such that the coil lead may be electrically connected to said circuit board, said connecting means comprising a hinge, said hinge having a flexible portion for articulately connecting one of said opposing edges of each of said members and comprising a pair of lead retaining elements each of which is connected between said flexible portion and the opposing edge of a different one of said members, each of said elements having a groove therein, said elements and grooves being aligned when said members are assembled to form a channel in said elements through which the coil lead may extend, said flexible portion being spaced from said lead retaining elements to define an open ended channel therebetween such that a lead extending through said groove may extend under said flexible portion and out the open ended channel.

16. The device according to claim 15 wherein each of said lead retaining elements has a plurality of parallel grooves therein, one of said grooves for each of the leads from the coil.

17. The device according to claim 16 wherein said flexible portion has an aperture therein through which a coil lead may extend.

18. The device according to claim 17 wherein said flexible portions insulate the lead extending through said aperture from the lead extending under said flexible portion and out the open-ended channel.

19. The device according to claim 5 wherein said connecting means comprises a hinge, said hinge having a flexible portion for articulately connecting one of the opposing edges of each of said members.

20. The device according to claim 19 wherein said hinge is integral with the members.

21. The device according to claim 5 wherein each of said members have a half cylindrical shape such that a substantially cylindrical shaped enclosure is formed when the members are assembled.

22. The device according to claim 19 wherein said hinge has a pair of lead retaining elements each of which is connected between said flexible portion and the opposing edge of a different one of said members.

23. A coil retaining device for use in mounting an FM coil or the like in a coil housing on a circuit board, the coil being of the type which is wound on a coil form and having at least one lead extending from the coil to connect it to the circuit board, said device comprising a pair of coil form retaining members which assemble in opposing relationship to form an enclosure for the coil, each of said members having a portion situated on each end thereof, each of said end portions having an aperture therein, said apertures being aligned and shaped to engage and securely retain the coil form, said end portions being made of resilient material such that different size and shaped coil forms may be engaged and retained in position, means for articulately connecting one of the opposing edges of each of said members such that said members may be moved between assembled and separated positions, said connecting means having a groove therein, said elements and said grooves being aligned when said members are assembled to form a channel in said elements through which the coil lead may extend.

24. The device according to claim 23 wherein said flexible portion of said hinge has an aperture therein aligned with said channel such that the lead can extend through said aperture from said device to the tuner.

25. The device according to claim 21 wherein each of said end portions is substantially semicircular.

26. The device according to claim 6 wherein said connecting means comprises a hinge, said hinge having a flexible portion for articulately connecting one of the opposing edges of each of said members.

27. The device according to claim 26 wherein said hinge is integral with the members.

28. The device according to claim 6 wherein each of said members has a half cylindrical shape such that a substantially cylindrical shaped enclosure is formed when the members are assembled.

29. The device according to claim 26 wherein said hinge has a pair of lead retaining elements each of which is connected between said flexible portion and the opposing edge of a different one of said members.

30. A coil retaining device for use in mounting an FM coil or the like in a coil housing on a circuit board, the coil being of the type which is wound on a coil form and having at least one lead extending from the coil to connect it to the circuit board, said device comprising a pair of coil form retaining members which assemble in opposing relationship to form an enclosure for the coil, each of said members having a portion situated on each end thereof, each of said end portions having an aperture therein, said apertures being aligned and shaped to engage and securely retain the coil form, each of said end portions having a slot extending from said aperture whereby said end portions may deform and thus retain the coil forms of different sizes and shapes, means for articulately connecting one of the opposing edges of each of said members such that said members may be moved between assembled and separated positions, said connecting means having a lead aperture forming a passage therethrough when said members are assembled such that said coil lead may be electrically connected to said circuit board, said connecting means comprising a hinge, said hinge having a flexible portion for articulately connecting one of the opposing edges of each of said members, said hinge having a pair of lead retaining elements each of which is connected between said flexible portion and the opposing edge of a different one of said members, each of said elements having a groove therein, said elements and said grooves being aligned when said members are assembled to form a channel in said elements through which the coil may extend.

31. The device according to claim 30 wherein said flexible portion of said hinge has an aperture therein aligned with said channel such that the lead can extend through said aperture from said device to the circuit board.

32. The device according to claim 26 wherein each of said end portions is substantially semicircular.

* * * * *

UNITED STATES PATENT OFFICE
CERTIFICATE OF CORRECTION

Patent No. 3,846,725             Dated November 5, 1974

Inventor(s) Mears, Donald B., Jr., Enfield, Conn.

It is certified that error appears in the above-identified patent and that said Letters Patent are hereby corrected as shown below:

In item [73] "Newark, Ill." should read

-- Newark, New Jersey --.

Signed and sealed this 7th day of January 1975.

(SEAL)
Attest:

McCOY M. GIBSON JR.
Attesting Officer

C. MARSHALL DANN
Commissioner of Patents